United States Patent [19]

Jackson et al.

[11] 3,888,777

[45] June 10, 1975

[54] HEAT TRANSFER AGENTS
[75] Inventors: Larry L. Jackson; Walter F. Seifert; Daniel E. Collins, all of Midland, Mich.
[73] Assignee: The Dow Chemical Company, Midland, Mich.
[22] Filed: Apr. 2, 1971
[21] Appl. No.: 130,839

[52] U.S. Cl................................... 252/73; 252/67
[51] Int. Cl............................................. C09k 3/02
[58] Field of Search............... 252/73, 52 R, 67–69

[56]  References Cited
UNITED STATES PATENTS

| | | | |
|---|---|---|---|
| 1,882,809 | 10/1932 | Grebe ................................... | 252/67 |
| 2,033,662 | 6/1935 | Cox et al. ........................ | 252/73 X |
| 2,095,619 | 10/1937 | Stoesser et al..................... | 252/73 X |
| 2,149,789 | 3/1939 | Rittler et al....................... | 252/73 X |
| 2,933,450 | 4/1960 | Lyding................................... | 252/73 |
| 3,429,816 | 2/1969 | Giolito et al...................... | 252/73 X |

OTHER PUBLICATIONS

Mullin, *Crystallization*, London, Butterworth & Co., 1961, pp. 83–84.
Handbook of Chemistry & Physics, 31st Ed., Chemical Rubber Publishing Co., 1949, p. 2396.
Hackh's Chemical Dictionary, 4th Ed., McGraw-Hill Book Co., 1969, p. 571.

*Primary Examiner*—Leon D. Rosdol
*Assistant Examiner*—Harris A. Pitlick
*Attorney, Agent, or Firm*—Chessie E. Rehberg

[57]  ABSTRACT

New three-component heat transfer agents of by volume 5 to 90 percent of diphenyl oxide, 5–50 percent of biphenyl and 5 to 90 percent of biphenylyl phenyl ether have been discovered.

10 Claims, No Drawings

HEAT TRANSFER AGENTS

BACKGROUND OF THE INVENTION

The ideal characteristics of a heat transfer agent employed in most applications include a broad temperature range of liquidity and a high thermal stability. A number of heat transfer agents are known in this market, but there is a continuing search for better heat transfer fluids.

Rittler et al. in U.S. Pat. No. 2,149,789 show the addition of biphenylyl phenyl ethers to acyldiphenyl ethers to obtain heat transfer agents that are effective at temperatures above 300°C. This reference, however, does not teach the three component system of the present invention.

SUMMARY OF THE INVENTION

It has now been discovered according to the present invention that a three component heat transfer fluid of by volume 5 to 90 percent of diphenyl oxide, 5 to 50 percent of biphenyl and 5 to 90 percent of biphenylyl phenyl ether is a superior heat transfer fluid. These fluids have a greater range of liquidity than known heat transfer agents while at the same time retaining desirable thermal stability characteristics.

The heat transfer agents of the invention contain three components: diphenyl oxide, biphenyl and biphenylyl phenyl ether. Diphenyl oxide and biphenyl, of course, are well known. Biphenylyl phenyl ether is not as widely known but is used in the present invention as the o-, p- or m- biphenylyl phenyl ether.

In the preparation of the biphenylyl phenyl ether, a mixture of the isomers is usually obtained and used in the fluid. In the present invention, however, the use of biphenylyl phenyl ether containing at least about 50 percent by weight and preferably more than about 75 percent by weight of the meta isomer is preferred.

As noted, the proportions of the components of the heat transfer fluid may vary widely so long as each component is present in the amounts specified. In preferred compositions, about 30 to about 70 percent by volume of the mixture is biphenylyl phenyl ether, with those fluids containing about 40 percent to about 60 percent by volume of biphenylyl phenyl ether being especially preferred because of their desirable low temperature characteristics. Also preferred in the present invention are those compositions where the diphenyl oxide and biphenyl are present in the proportion of the eutectic mixture, referred to under the trade name Dowtherm A. Of special interest are compositions of Dowtherm A and m-biphenylyl phenyl ether containing about 30 to about 70 volume percent of Dowtherm A, with those fluids containing about 40 to about 60 percent Dowtherm A being of particular importance because of their low freezing points.

The new heat transfer fluids are used in the same manner as known fluids. They, however, have advantages over the known fluids because of their broader range of liquidity. This advantage permits the use of the fluid under more adverse conditions of temperatures without taking special precautions. For example, the fluids of the invention are suitably used in outside conduits during winter, whereas fluids having a higher freezing point cannot be used or can only be used when the conduit is warmed to prevent freezing.

In addition to a lower freezing point, the fluids of the invention usually exhibit a higher boiling point. This characteristic results in a lower vapor pressure at given temperatures below the boiling point for the compositions of the invention. This lower vapor pressure is advantageous because of the pressure in the heating unit is lower, thus reducing the work required for maintenance and leak prevention.

In addition to their desirability as heat transfer fluid, the compositions of the present invention are also suitable for use as lubricants and as hydraulic fluids. The wide temperature range of liquidity of the present fluids allow such use when the fluid must withstand extremes of cold and extremes of heat in a particular application.

Representative properties and compositions of the fluids of the invention are shown in the Specific Embodiments.

SPECIFIC EMBODIMENTS

Mixtures of diphenyl oxide, biphenyl and biphenylyl phenyl ether were prepared in the proportions shown in Table I. Unless noted, the biphenylyl phenyl ether was a mixture of isomers which were about 70 percent ortho, 25 percent para and 5 percent meta. These fluids are compared to known fluids.

TABLE I

HEAT TRANSFER FLUIDS OF DIPHENYL OXIDE (DPO), BIPHENYL (BP) AND BIPHENYLYL PHENYL ETHER (BPE)

| Example | Composition, Vol.% | | | Liquidity Characteristics | |
|---|---|---|---|---|---|
| | DPO | BP | BPE | Freezing Pt.,°F. | Boiling Pt.,°F. |
| Comp.A | 100 | — | — | 82 | 495 |
| Comp.B | — | 100 | — | 158 | 493 |
| Comp.C | — | — | 100 | 99 | 662 |
| Comp.D* | 73.6 | 26.4 | — | 54 | 495 |
| 1 | 10 | 15 | 75 | 0 | 590 |
| 2 | 5 | 10 | 85 | 35 | 615 |
| 3 | 5 | 15 | 80 | 34 | 600 |
| 4 | 5 | 20 | 75 | 35 | 590 |
| 5 | 20 | 5 | 75 | 35 | 590 |
| | Dowtherm A | | BPE | | |
| 6 | 20 | | 80 | 19 | 600 |
| 7 | 25 | | 75 | 15 | 590 |
| 8 | 30 | | 70 | −10 | 572 |
| 9 | 40 | | 60 | −7 | — |
| 10 | 50 | | 50 | −35 | 543 |
| 11 | 55 | | 45 | −41 | — |
| 12 | 65 | | 35 | −10 | — |
| 13 | 60 | | 40 | −27 | — |
| 14 | 70 | | 30 | 1.5 | 516 |
| 15 | 75 | | 25 | 29 | 509 |
| 16 | 80 | | 20 | 35 | — |
| 17 | 50 | | 50** | −40 | 544 |
| 18 | 50 | | 50*** | 28 | 540 |

*Dowtherm A
**m-BPE
***o-BPE

In the same manner as shown by the examples above, other fluids containing by volume 5 to 90 percent of diphenyl oxide, 5 to 50 percent of biphenyl and 5 to 90 percent of biphenylyl phenyl ether, such as 50 percent diphenyl oxide, 40 percent biphenyl and 10 percent biphenylyl phenyl ether; and 80 percent diphenyl oxide, 10 percent biphenyl and 10 percent biphenylyl phenyl ether, are prepared and found to have broad liquidity ranges.

We claim:
1. A composition of matter of, by volume,
   5 to 90 percent of diphenyl oxide,
   5 to 50 percent of biphenyl and
   5 to 90 percent of biphenylyl phenyl ether.

2. The composition of claim 1 wherein at least about 50 percent by weight of the biphenylyl phenyl ether is m-biphenylyl phenyl ether.

3. The composition of claim 2 wherein at least about 75 percent by weight of the biphenylyl phenyl ether is m-biphenylyl phenyl ether.

4. The composition of claim 1 wherein the biphenylyl phenyl ether is m-biphenylyl phenyl ether.

5. The composition of claim 1 wherein about 30 to about 70 percent by volume of the composition is biphenylyl phenyl ether.

6. The composition of claim 5 wherein about 40 to about 60 percent by volume of the composition is biphenylyl phenyl ether.

7. The composition of claim 1 wherein the diphenyl oxide and biphenyl are present in the proportion of the eutectic mixture.

8. The composition of claim 7 wherein the biphenylyl phenyl ether is m-biphenylyl phenyl ether.

9. The composition of claim 8 wherein about 30 to 70 volume percent of the composition is the eutectic mixture of diphenyl oxide and biphenyl.

10. The composition of claim 9 wherein about 40 to about 60 percent is the eutectic mixture.

* * * * *